US009034221B2

(12) United States Patent
Kozlowski et al.

(10) Patent No.: US 9,034,221 B2
(45) Date of Patent: May 19, 2015

(54) INTUMESCENT FIRE RETARDANT AND THE METHOD OF ITS MANUFACTURE

(75) Inventors: Ryszard Kozlowski, Poznan (PL); Dorota Wesolek, Poznan (PL); Maria Wladyka-Przybylak, Poznan (PL)

(73) Assignee: Instytut Wlokien Naturalnych I Roslin Zielarskich, Pozan (PL)

( * ) Notice: Subject to any disclaimer, the term of this patent is extended or adjusted under 35 U.S.C. 154(b) by 1436 days.

(21) Appl. No.: 11/660,258

(22) PCT Filed: Sep. 1, 2005

(86) PCT No.: PCT/PL2005/000057
§ 371 (c)(1),
(2), (4) Date: Feb. 15, 2007

(87) PCT Pub. No.: WO2007/027114
PCT Pub. Date: Mar. 8, 2007

(65) Prior Publication Data
US 2009/0215926 A1  Aug. 27, 2009

(51) Int. Cl.
*C08K 5/52* (2006.01)
*C08L 85/02* (2006.01)
*C08L 61/28* (2006.01)
*C08L 61/20* (2006.01)

(52) U.S. Cl.
CPC .............. *C08K 5/5205* (2013.01); *C08L 85/02* (2013.01)

(58) Field of Classification Search
CPC ....... C08K 5/5205; C08L 85/02; C08L 61/28; C08L 61/20
USPC .................................. 524/127, 142
See application file for complete search history.

(56) References Cited

U.S. PATENT DOCUMENTS

| 2,729,611 | A | * | 1/1956 | Chesley, Jr. et al. | .......... 524/598 |
| 3,275,605 | A | * | 9/1966 | Eastes et al. | .................. 528/263 |
| 4,636,538 | A | | 1/1987 | Malcomm-Brown | |
| 5,853,886 | A | * | 12/1998 | Pinnavaia et al. | ............. 428/403 |
| 6,084,008 | A | * | 7/2000 | Liu | ............................... 523/179 |
| 2001/0051689 | A1 | * | 12/2001 | Foreman et al. | ............. 525/309 |
| 2004/0087689 | A1 | * | 5/2004 | Kaprinidis et al. | ............. 524/99 |
| 2004/0110870 | A1 | * | 6/2004 | Liu | ............................... 523/179 |

FOREIGN PATENT DOCUMENTS

| EP | 1475 407 | A2 | | 3/2004 | | |
| GB | 1333128 | | * | 10/1973 | | |
| JP | 2002-138219 | | * | 5/2002 | ............. | C08K 3/00 |
| PL | 175344 | | * | 1/1995 | ............. | A62D 1/00 |

OTHER PUBLICATIONS

Ethyl Silicate MSDS JT Baker Nov. 21, 2008.*
File 2,4,9-tetramethyl-5-decyne-4,7-diol: http://commons.wikimedia.org/wiki/File:2-4-9-Tetramethyl-5-decyne-4,7-diol.png.*
A. Kviklys et al. Mechanics of Composite Materials vol. 40 No. 3 2004 pp. 253-258.*
SOL.-GEL Chemistry Mauritz Group, University of Southern Mississippi c. 1996. http://www.psrc.usm.edu/mauritz/solgel.html.*
Surfynol 104 Surfactant MSDS Air Products Version 1.19 Revision Date Sep. 16, 2008 MSDS No. 300000004747 http://www.airproducts.com/producstewardship/.*
Surfynol 104 Surfactant MSDS Air Products.Rev 1-19 Sep. 16, 2008.*
Degussa MSDS Degussa Aerosil 200 MSDS 200 Apr. 3, 2002; Parsippany NJ USA {http://www.esi-1.com/msds/AEROSIL%20200%20MSDS.pdf}.*
Hysteresis entry: Hawleys Condensed Chemical Dictionary 14th ed 2002 John Wiley and Sons {http://app.knovel.com/web/view/html/show.v/cid:kt0035RVI3/viewerType:html/root_slug:hysteresis/url_slug:hysteresis?q=hysteresis&b-q=hysteresis&b-subscription=true&b-within-title=true&b-group-by=false&page=1}.*
Engineering Tool Box Jun. 26, 2007 absolute-viscosity-liquids {http://www.engineeringtoolbox.com/absolute-viscosity-liquids-d_1259.html}.*
Trinity Minerals (Munich Show displays Oct. 4-8, 2000 {http://www.trinityminerals.com/ms2000/erythrite.shtml}).*
Evonic, "Hydrophilic fumed silica", retrieved from "http://www.aerosil.com/product/aerosil/en/products/hydrophilic-fumed-silica/pages/default.aspx", retrieved on Apr. 22, 2014.
Evonic, "AEROSIL® 200 Hydrophilic Fumed Silica, retrieved from www.novochem.ro/letoltes/aerosil%20r%20200%20en.pdf", retrieved on Apr. 22, 2014.
Ash et al. "Handbook of Fillers, Extenders, and Diluents, Second edition", 2007 p. 8.
Flick, Ernest W., "Plastics Additives: An Industrial Guide, vol. 3", 2002, Aerosil listing.
Sigma-Aldrich, "LUDOX® SM colloidal silica", retrieved from "www.sigmaaldrich.com/catalog/product/aldrich/420794?lang=en&region=US", retrieved on Apr. 22, 2014.
Du Pont, "LUDOX® Colloidal Silica Data Sheet", retrieved from "legacy.library.ucsf.edu/documentStore/s/t/c/stc76b00/Sstc76b00.pdf", retrieved on Apr. 22, 2014.

* cited by examiner

*Primary Examiner* — Patrick Ryan
*Assistant Examiner* — Aaron Greso
(74) *Attorney, Agent, or Firm* — Walker & Jocke

(57) ABSTRACT

The topic of this invention is an intumescent fire retardant and a method for its manufacture. The application of modifiers in the form of so-called "nano-particles" in intumescent systems improves the efficiency fire retardancy and the effectiveness of the system's thermal insulation. The high dispersion of particles influences the decomposition of intumescent systems and the combustion process. Therefore, the structure and thermal resistance of the carbon layer formed are improved.

12 Claims, No Drawings

INTUMESCENT FIRE RETARDANT AND THE METHOD OF ITS MANUFACTURE

CONTINUATION DATA

This Application is a U.S. National Stage application under 35 U.S.C. §371 of PCT/PL2005/000057 filed 1 Sep. 2005.

BACKGROUND

The topic of this invention is an intumescent fire retardant and a method for its manufacture. The application of modifiers in the form of so-called "nano-particles" in intumescent systems improves the efficiency fire retardancy and the effectiveness of the system's thermal insulation. The high dispersion of particles influences the decomposition of intumescent systems and the combustion process. Therefore, the structure and thermal resistance of the carbon layer formed are improved.

There are intumescent fire retardants known, which are based on synthetic resins with additions of pore-forming, charring, and dehydrating substances. Most often these take the form of a paint or a coating. The latest developments in the use and production of small, nanometer-sized particles have created new possibilities for fire retardancy research.

Intumescent systems based on particles with large dispersion factors, so-called "nanomolecules" are a new concept. Recent research conducted on the production of very small particles, nanometer-sized, also opened new avenues for material production. Today, nanotechnology plays a key role in various disciplines, such as material processing, precision mechanics, optics, electronics or ceramics. Nanometer material technologies are just beginning to make inroads into practical application, though at an ever increasing rate.

This is a new direction in fire-proofing, but most of the solutions relate to flame retardant nanocomposite materials, containing nanostructures.

We have not seen any reports (trade or literature) pertaining to intumescent fire retardants, which would make use of nanometer sized materials. This is because it isn't easy to obtain "antypirogenic" compounds, fire retardants, with nanomolecules. There has been much success, and thus application, of metal nanomolecules (gold, palladium, cobalt), nanomolecular polymers and other compounds such as aluminium polyphosphate as well as metal oxides such as $Fe_2O_3$. Currently, most of the research seems to concentrate on the possibilities of producing nanoscaled compounds. The technologies necessary to produce MgO, $SiO_2$ and carbon blacks at the nanoscale are quite well known. However, the production of agents and entire systems which effectively reduce the flammability of materials (both research and applied techology) is still very much in its infancy.

IBM researchers have combined nanotechnology with chemistry to synthesize magnetic nanomolecules (iron-platinum magnetic particles) of precisely controlled sizes that may one day allow magnetic hard disks and other data storage media to store over 100 times more information than today's products.

Degussa-Huels is driving the development of new technology for the production of nanoscale particles such as Aerosil (silica) and carbon blacks.

Publications concerning investigations into the synthesis, characterization and theoretical modelling of carbon nanotubes have reported that the electronic properties of these tubes are so "extremely sensitive" to oxygen that exposure to air can convert a semiconducting nanotube into a metallic conductor.

Nanophase technologies Corp. has received an initial order for its NanoClad metal oxides for use in high reliability application thermal spray coatings on U.S. naval vessels.

Moyco Technologies, Inc. has received several purchase orders for its diamond particle-coated polishing films from a major fiber-optic connector company.

New technology for the manufacture and usage of products ranging from computer chips to medical diagnostic devices may soon become possible thanks to a recent discovery at the Michigan Molecular Institute (MMI) and Dendritech, Inc. The scientific breakthrough involves the use of dendrimers, a new class of polymers, to trap metal clusters, enabling for formation of nanocomposites. Dendrimer-based materials represent a new molecular architecture that mimics the dendritic branching. The size, shape, and surface reactivity can be controlled very precisely, and metals can now be placed inside a dendrimer at the atomic and nanoscale level. These can trap and contain materials normally thought to be insoluble, such as gold, silver, cooper, nickel, cobalt, platinum, and iron. Furthermore, normally water-insoluble inorganic salts, such as silver halide, can now solubilized.

Southern Clay Products, a Laporte, Inc. company, has developed Cloisite nanoclays, high-aspect-ratio additives based on montmorillonite clay for the plastics industry. In dry form, Cloisite exists in clusters or aggregate of montmorillonite platelets with very little surface exposed. The nanoclay platelets are characterized by a very high surface area and a high aspect ratio. To achieve maximum exposure of the potential surface area in polymer dispersion, the platelets of montmorillonite must be homogeneously distributed throughout the polymer matrix and with a spacing of a least 7 nm. The nanocomoposite plastic will have greater dimensional stability at low reinforcement loading levels, a higher heat distortion temperature, and better recyclability than typical plastic composites. There is also an improvement in flame retardancy compared with conventional reinforced parts, and static cling is reduced in films formed from the nanocomposites, as reported in: [NANOPARTICLE NEWS, Volume 3, Number 3, April 2000, Business Communications Co., Inc. Norwalk, Conn., 06856; *"Flame Retardancy"*, *Annual BCC Conference on Flame Retardancy, Recent Advances in Flame Retardancy of Polymeric Materials, Holiday Inn Select, Stamford, Conn.*].

Patent description PL 175344 (Jan. 11, 1995) presents an intumescerit fire retardant in the form of a transparent coat which forms a layer of insulating foam at high temperatures. It is characterised in that it contains urea and/or melamine, dicyanate diamide, formaldehyde, phosphoric acid or its derivatives and/or boric acid and/or ammonium sulphate, starch or dextrin, melamine-formaldehyde resin, glycol or glycerine. The manufacturing method is based on the condensation of the amine-formaldehyde resin, where a portion of the components is introduced with constant stirring at a temperature of 70-90° C., and the remaining components are introduced at room temperature. The material is used in decorative coating, transparent coatings for wood and wood-like materials.

Patent description PL 161134 (Dec. 8, 1988) describes a flame retardant and a method for its manufacture.

Patent description PL 166657 (Apr. 16, 1991) describes a fire retardant putty composed of a carrier and a material which increases its volume at increased temperatures, containing hydrated sodium silicate, characterised in that the carrier is granulated or ground styrofoam 0.5 to 20 mm in diameter and comprising 85 to 94% of the volume. Said granules are surrounded by the swelling mixture, 6 to 15% of the volume, composed of 65 to 85% hydrated sodium silicate, 2 to 35% silica, 0.5 to 5% dehydrator, 0.1 to 1.8% inorganic staining pigment and 0.2 to 2% inorganic coating pigment.

Patent description U.S. Pat. No. 3,440,201 describes an intumescent agent which renders transparent coatings, as well as a method for its manufacture. This compound is obtained through the reaction of a polyol phosphate ester in an organic solvent with an alcoxymelamine formaldehyde resin.

Patent description CN1540047 (published Oct. 27, 2004) describes a method for producing nano-fire resistant and fire retardant fiber. A fire-retarding refractory nanofibre is prepared through the preparation of a nano additive from SiO2 and Al2O3, mixing it with cellulose, preparing spinning dope, and spinning. Its advantages are high strength and elongation, low moisture regain, and high refractory effect (1300 deg.C). Patent description CN1544552 (published Nov. 10, 2004) presents fireproof tunnel paint based on nano-surface-treatment technology and a method for the production thereof. The invention relates to a fire-resisting tunnel paint including fire-resisting paint and nano-paint having modified surface functional properties, wherein the fire-resisting paint is comprised of silicate, phosphate adhesive, polymer emulsion, skeletal material, fortifying fiber and combustion inhibitor, while the nano-paint possesses modified surface functional properties comprised of a non-flammable composite polymer-based material, composite nano-material, a nano-material surface modifier, fire-retardant elasticizer, gasoline as a solvent and a fluid deformation agent.

Patent description CN1542036 (published Nov. 3, 2004) describes a method for manufacturing nanometer magnesium hydroxide fire retardant. This invention relates to the manufacturing process of nano-magnesium hydroxide fire retardant and is a part of the physico-chemical process for preparing the compound. The process of this invention features polymer protectant activity, wherein a soluble magnesium salt and soluble alkali materials are transformed into magnesium hydroxide powder through forced emulsification and precipitation in a high-shear homogenizing emulsifier, and subsequent filtering, washing and drying. The special, high-shear homogenizing emulsifier is provided with a motor, casing, stator, rotor, liquid flow guide unit and other parts, and has rotation speed regulated according to the product grain size. The magnesium hydroxide product has grain size of 5-200 nm, high purity and excellent fire retarding performance.

Patent description CN1536000 (published Oct. 13, 2004) describes a nano-inorganic composite fire-resisting agent for macromolecular material. This invention relates to a nano-inorganic composite fire-retardant for macromolecular material. It is composed of nano-aluminium hydroxide, nano-structure modified aluminium hydroxide or nano-magnesium hydroxide and micro-size magnesium hydroxide and auxiliary fire retardant, in which the average grain size of nano-aluminium hydroxide is less than or equal to 100 nanometers, the average grain size of nano-structure modified aluminium hydroxide is less than or equal to 150 nanometers, the average grain size of nano-magnesium hydroxide is less than or equal to 100 nanometers, the average grain size of micro-size magnesium hydroxide is 1-10 microns, and the mass ratio of the nano-sized inorganic fire retardant and micro-sized magnesium hydroxide is from 80:20 to 10:90, and the mass ratio of the nano-sized inorganic fire-retardant and micro-sized magnesium hydroxide and auxiliary fire retardant is from 100:10 to 100:30. It can be used in fire-retarding composite materials based on PE, PP, ABS, nylon, PC, PVC, EVA, polyester, and etc.

Patent description CN1506395 (published Jun. 23, 2004) describes the preparation of a fireproof hard foamed polyurethane modified with laminated silicate. The preparation process of fireproof hard foamed polyurethane modified with laminated silicate includes the following steps: mixing of a multi-hydroxyl compound, catalyst, foam stabilizer, fire retardant and other components homogeneously to prepare the polyurethane composition; forced mixing the polyurethane composition with a surface-treated laminated nano-silicate at 30-50° C. for at least 30 min to operate intercalated mixture; mixing the intercalated mixture with foaming agent at 15-25° C. and a further addition of polyisocyanate to elicit an intercalation reaction resulting in hard foamed PU material with excellent fireproof and mechanical performance. Without the plasticizing effect of organic phosphate fire retardant and hydrofluochlorohydrocarbon in foamed PU, the hard foamed PU material of the present invention has excellent fireproof performance as well as high compression strength and high size stability.

Patent description CN1483779 (published Mar. 24, 2004) describes a flame-retardant coating and a method for the preparation thereof. The invention discloses a fire-resisting coating material and its preparation method. Its composition includes 20-40 portions of methyl or phenyl or vinyl 120-2 type silicon rubber, or a mixture thereof, 3-6 portions of cross-linking solidifying agent, peroxide series benzoyl or bis-di-quadri, 13-25 portions of fortifier nano-grade white carbon black and 40-60 portions of inorganic filler. Said fire-resisting coating material can be applied onto PAN-based oxidized fibre fire-resisting fabric, and not only can it raise its fire-resisting performance, but it also can retain its physical performance.

Patent description WO03097735 (published Nov. 27, 2003) describes nano-particulate tin coated products. A process for the preparation of an inorganic filler material coated with a nano-particulate tin compound which comprises the formation of a slurry of the filler material in an aqueous colloidal suspension of a tin compound, whereby the tin compound is directly precipitated from the colloidal suspension onto the surface of the filler, separation of the inorganic filler from the colloidal suspension and, optionally, heating the coated filler to convert the hydrated tin compound to its anhydrous form. A fire retardant material is comprised of a particulate inorganic material coated with a nano-particulate tin product from 1 to 100% by weight, based on the weight of the inorganic filler.

Patent description CN1422925 (published Jun. 11, 2003) describes a nano-CR-SBC composite adhesive. The invention refers to an organic viscose agent, composed of anti-aging agent of nano-composite rubber, fire-retardant agent, resin, plasticizer, solvent and so on. The composite rubber adopts two nano-powder bodies, the first one is nano-SiO2-X, the second one is CaCO3, and the first of the two nano-powder bodies and the rubber are made into composite nano-rubber. The nano-rubber and the other waymaterials are two components, one composed of composite thermoplastic butyl-benzene rubber, terpene resin, petroleum resin, denaturing rosin, anti-aging agent, combustion-stopping agent and solvent, the other one composed of nano-composite neoprene, 2402 resin, anti-aging agent and solvent. This adapts the preparation method to make the nano-CR-SBS compositive viscose agent.

Patent description WO0066657 (published Nov. 9, 2000) describes fire retardant compositions. A polymer composition is provided, comprised of a polymer and a synergistic flame retardant additive combination which comprises a nano-clay and a second filler. The second filler may be a material with known flame retardant properties, an inert filler or a combination of the two. The preferred nano-clay is Cloisite, the preferred second filler is aluminium trihydroxide. The presence of this flame retardant additive combination in polymers increases the strength of the char that forms during combustion. The formation of a strong char creates a barrier to ignition of the underlying material, for example electrical cables that have been provided with a coating of the polymeric composition.

Patent description JP2004331975 (published Nov. 25, 2004) describes a flame retardant-nano-composite material combination comprising a thermoplastic polymer. The flame retardant-nanofiller combination for thermoplastic polymer comprises, a specific phosphinate and/or a specific diphosphinate and/or their polymers as component A; and a melamine condensate product and/or a reaction product of the melamine with phosphoric acid or polyphosphoric acid and/or a reaction product of the melamine condensate product with phosphoric acid or polyphosphoric acid and/or their mixture as component B, and/or an organic intercalation-type phyllosilicate, a nanospherical oxide or carbon nanotube as component C.

Patent description KR2002010561 (published Feb. 4, 2002) describes the preparation of a flame retardant foam using nano-ceramic.

Patent description WO2004108826 (published Dec. 16, 2004) describes curable flame retardant epoxy resin compositions. A curable flame retardant epoxy resin composition including (a) at least one flame retardant epoxy resin; (b) at least one amphiphilic block copolymer; and (c) a curing agent. Such components are present in the curable composition in the appropriate amounts and ratios such that, upon curing, the block copolymer self-assembles into a nano-structure morphology, such as a worm-like micelle morphology. The resulting cured product made from the composition of the present invention has a remarkably increased high fracture resistance and allows the use of flame retardant epoxies in applications where fracture resistance is an issue.

Patent description WO2004074361 (published Sep. 2, 2004) describes a flame retardant composition. This invention is a flame-retardant composition comprised of a polyolefin polymer, a nano-silicate, a metal hydroxide, and calcium carbonate. The invention also includes a coating prepared from the flame retardant composition as well as a wire- and cable construct made by applying the coating over a wire or a cable. The invention also includes articles prepared from the flame-retardant composition, such as extruded sheets, thermoformed sheets, injection-molded articles, coated fabrics, roofing membranes, and wall coverings.

Patent description WO2004056913 (published Jul. 8, 2004) describes flame retardant polymer compositions. Flame retardant compositions are disclosed comprised of (a) at least one particulate material which expands upon the application of heat and (b) at least one particulate nano-filler, together with at least one polymer and/or at least one curable monomer or oligomer. The compositions may also contain certain silicon-based materials. Flame-retardant compositions comprised of polyorganosiloxanes containing one or more functional groups selected form among amino, hydroxyl, methacrylic, acrylic and epoxy groups, are also disclosed.

Patent description WO2004013528 (published Feb. 12, 2004) describes a cover for a conduit fitting comprised of sheets of preformed, flexible cellular fire-retardant foam or sponge joined together by an intumescent adhesive to form a cover open on one side and dimensioned to form a reasonably snug fit about the external walls of an open-sided conduit fitting. Each sheet is first coated with a primer solution comprised of an aqueous solution of an acrylic copolymer which includes ammonium polyphosphate, including a sealant and secondly with a fluid coating of a fire-retardant material. The primer solution operates to close the open pores of the surface and provides a bond to which the fire-retardant coating can adhere.

Patent description US2004031416 (published Feb. 19, 2004) describes a solution for forming a fire resistant coating on substrates such as timber, comprised of an aqueous solution of an alkali metal silicate containing from about 5 to about 70% by weight of the alkali metal silicate and having dispersed therein a filler amounting to about 5 to 60%. The filler is preferentially an intumescent material such as a graphite capable of exfoliation. The solution may be applied by brushing or spraying onto timber in a mine to form coatings from 1 to 4 mm in thickness.

Patent description EP1300506 (published Apr. 9, 2003) describes a solution relating to a textile substrate with improved resistance to heat and fire with an ignifuge coating comprised of a polymer binder and an intumescent composition which is additionally comprised of a small quantity of one or more synergic agents in the coating which act under the influence of heat to produce a fine uniform layer on top of the deep alveolar layer produced by the intumescent compound. The synergic agents are aluminum hydroxide, magnesium hydroxide, bauhemite, titanium oxide, sodium silicate, zeolites, low melting point glass, clay nanomolecules, a borosilicate product, polyamide, polypropylene and polyester nanocomposites. The synergic agent is used at 0.2-3% m/m with respect to the polymer binder.

Patent description WO9943390 (published Sep. 2, 1999) describes a fire-retardant coating material containing a fluid intumescent base material with a foaming agent, a blowing agent, a charring agent, a binding agent, a solvent, and a pigment. The coating material further includes a flame spread reduction agent; refractory fibers dispersed in the fluid intumescent base material; an oxidation limiting agent; a thermal transmission limiting agent; a stabilizer and volatile organic reduction component; a mechanical enhancer component for physical impact resistance and adhesion; a water-resistance agent; and an elasticity agent to increase resistance to cracking and shrinking, and to improve the ease of spraying.

Patent description WO9800461 (published Jan. 8, 1998) describes a fire-retardant material in powder form used, as an additive for many types of plastics, epoxies, urethanes, resins and coal tars including an intumescent base material having a foaming agent, a blowing agent, and a charring agent; a flame spread reduction agent which provides protection against radiant heat flux density of up to 600 kW per square meter for a duration of 5 minutes; and refractory fibers in the additive material. Patent description JP8253710 (published Oct. 1, 1996) describes an intumescent coating material with improved resistance to water, fire, and weatherering by incorporating melamine-coated ammonium polyphosphate particles and/or insoluble ammonium polyphosphate particles having cross-linked surfaces into the material. In this solution, ammonium polyphosphate particles are heated to 300° C. or lower for 0.5-5 hr to separate 5-10% m/m of the stoichiometric amount of ammonia. Melamine is added to the heated particles at 250-300° C. to cause the addition reaction and/or adhesion of melamine to the hydroxyl groups of acids formed on the surfaces of the particles by the separation of ammonia, yielding melamine coated ammonium polyphosphate particles (A). A compound with functional groups reactive with the active hydrogen atoms of amino groups of the melamine molecules on the surfaces of particles A is added in an equivalent ratio to the amino groups of 0.5-6 to particles A and is heated to 80-200° C. for such a time as is necessary to form cross-links with melamine on the surfaces, yielding insoluble ammonium polyphosphate particles (B). An intumescent fire resistant coating material is prepared by compounding 100 parts by mass of synthetic binder resin with 50-400 parts by mass of particles A and/or B. Patent descriptions EP0505940 (published Sep. 30, 1992) and CA2063457 (published Sep. 21, 1992) describe intumescent fire-resistant coatings, fire-resistant material, and a process for producing the fire-resistant material. In this solution, the coating essentially comprised of (A) at least one inorganic compound selected from the group consisting of a carbide, boride, nitride, carbonitride, or carboboride of titanium, zirconium, vanadium, niobium, tantalum, molybdenum, tungsten, or chromium and a carbide, boron nitride or carbonitride, (B) a synthetic resin, and (C) at least one phosphorus and/or sulfur compound capable of forming a Lewis acid on heating.

Patent description CN1046174 (published Oct. 17, 1990) describes a fire-retardant coating material which contains a fluid intumescent material and refractory fibers of various sizes dispersed or suspended therein for particular applications. The fluid intumescent material includes a foaming agent, a blowing agent gas source, a carbonific or charring agent, a film-forming binder, a solvent and, in some cases, a pigment or filler. The refractory fibers consist of aluminum oxide, silicon dioxide, and one or more other metal oxides.

Patent description CA2321568 (published Sep. 2, 1999) describes a fire-retardant coating material containing a fluid intumescent base material having a foaming agent, a blowing agent, a charring agent, a binding agent, a solvent, and a pigment. The coating material further includes a flame spread reduction agent; refractory fibers dispersed in the fluid intumescent base material; an oxidation limiting agent; a thermal transmission limiting agent; a stabilizer and volatile organic reduction component; a mechanical enhancer component for physical impact resistance and adhesion; a water resistance agent; and an elasticity agent to increase resistance to cracking and shrinking, and to improve ease of spraying.

Patent description GB2329389 (published Mar. 24, 1999) describes fire-resistant coatings. This solution relates to intumescent fire-resistant coating compositions comprised of one or more hydrated alkali metal silicates and one or more rheology modifiers. The rheology modifiers include elemental carbon, silicon, silicon carbide, polysaccharides or modified polysaccharides.

Patent description US2004031416 (published Feb. 19, 2004) describes a solution for forming a fire resistant coating on substrates such as timber comprised of an aqueous solution of an alkali metal silicate containing, about 5 to 70% by mass, of the alkali metal silicate and having dispersed therein a filler amounting to about 5 to 60%. Preferentially, the filler is an intumescent material such as a graphite capable of exfoliation. The solution may be applied by brushing or spraying onto timber in a mine to form coatings from 1 to 4 mm in thickness Patent description U.S. Pat. No. 5,532,292 (published Jul. 2, 1996) describes an intumescent composition comprised of a saline soluble inorganic silicate fibrous material containing CaO, MgO and no more than 4% by weight of A1203, such as calcium magnesium silicate. The fibres may be vitreous, with an average length of 10 to 500 microns, and may form 5 to 30% by mass of the composition. The composition may be incorporated in a coating composition, e.g. for wet coating (paint) or powder coating, or a mastic or putty, or a composition containing a polymer. Enhanced fire protection can be provided, and the coating compositions may be applied as a single thick coating rather than by building up thin layers.

Patent description CA2023932 (published Feb. 25, 1992) discloses an intumescent coating composition comprised of an aqueous mixture of a water soluble alkali metal silicate, a hydrated metal silicate clay, and an inorganic particulate material which, when exposed to flame temperatures, endothermically releases a nonflammable gas. The coating can be applied to metal, wooden and foamed polymeric materials and serves to provide a thermal barrier against the effects of overheating.

Patent description GB2247420 (published Mar. 4, 1992) describes an intumescent coating composition comprised of an aqueous mixture of a water soluble alkali metal silicate, optionally a hydrated metal silicate clay, and an inorganic particulate material which, when exposed to flame temperatures, endothermically releases a nonflammable gas. The coating can be applied to metal, wooden and foamed polymeric materials.

Patent description U.S. Pat. No. 5,035,951 (published Jul. 30, 1991) describes an intumescent coating composition comprised of an aqueous mixture of a water soluble alkali metal silicate, a hydrated metal silicate clay, and an inorganic particulate material which, when exposed to flame temperatures, endothermically releases a nonflammable gas. The coating can be applied to metal, wooden and foamed polymeric materials and serves to provide a thermal barrier against the effects of overheating.

Patent description U.S. Pat. No. 4,888,057 (published Dec. 19, 1989) describes a fire resistant inorganic coating composition which intumesces when subjected to high temperatures to form a substantially continuous heat insulating structure and retains this structure for prolonged periods at temperatures up to 1000° C. The coating composition is comprised of, by mass, sodium silicate (aqueous solution) 40-70 parts, potassium silicate (aqueous solution) 40-70 parts, and silicon carbide powder 3-15 parts. A composite fire-protective coating system is also disclosed, comprised of multiple coatings sequentially applied to the substrate, typically aluminum, to be protected. Specifically, a first heat resistant, substantially air impermeable bonding layer and an inorganic intumescent layer as described above. An additional heat resistant air impermeable layer may be included as a top coat. Some applications may require an additional inorganic intumescent layer.

DETAILED DESCRIPTION

Despite the above listed research on the production of intumescent flame retardants and methods of their manufacture, there is still a real need to obtain more effective solutions, facilitating more efficient fire protection and thermoinsulation of intumescent compositions, minimizing their expenditure while maintaining their high quality.

The goal of the present invention is to render the means which could be used to produce intumescent fire retardants, while at the same time avoiding toxic compounds, including halide derivatives. Furthermore it is a goal to increase the fire retardant and thermoinsulatory properties of the intumescent composition, while maintaining its non-toxicity.

The realisation of such a defined goal and resolution of the problems described in the state of the art regarding the production of intumescing fire retardant agents in order to obtain an intumescent agent which forms a carbonified layer at an increased rate upon exposure to flame or radiated heat and which would have a denser carbon skeleton, increased intumescent, fire retardant and thermoinsulatory efficiency as well as being non-toxic and of high quality were achieved in the present invention.

The subject of the present invention is a fire retardant agent based on amine-formaldehyde resins and phosphorus compounds, containing urea and/or melamine, dicyano diamide, formaldehyde, phosphoric acid or its derivatives containing substantial quantities of nitrogen, particularly mono- or diamine phosphate and/or urea phosphate and/or melamine phosphate and/or boric acid and/or ammonium sulphate, starch or dextrin, preferentially erithrite and its oligomers, and methoxylated or butoxylated melamine-fomaldehyde resin, characterised in that it contains modifiers in the form of nanomolecules, a low-order alohol and a surface-active moistener.

Preferentiallly, the modifier is nanoscale silica, 0.2-5% by mass, in relation to the condensed mass.

Preferentiallly, it contains nanoscale silica introduced during the condensation as a solid or colloidal suspension.

Preferentiallly, the silica is composed of particles of 2 to 100 nanometers.

Preferentiallly, the low-order alcohol is methanol, ethanol or isopropanol.

Preferentiallly, the agent contains a surface-active hydrating agent.

Preferentiallly, the surface-active hydrating agent is 2,4,7,9-tetramethyl-5-decin-4,7-diol.

Preferentiallly, when the intumescent efficiency is increased by 100 to 20000% upon contact with radiant heat and/or direct contact with flames.

The next subject of the present invention is a method of manufacturing an intumescent flame retardant agent based on the condensation of an amine-formaldehyde resin, into which under constant mixing the following are added: urea and/or melamine, dicyano diamide, formaldehyde, phosphoric acid or its derivatives containing substantial quantities of nitrogen, particularly mono- or diamine phosphate and/or urea phosphate and/or melamine phosphate and/or boric acid and/or ammonium sulphate, starch or dextrin, preferentially erithrite and its oligomers, and methoxylated or butoxylated melamine-fomaldehyde resin, characterised in that nanoscale modifiers are introduced during the condensation at a rate of 0.2 to 5% by mass in relation to the condensate mass, in solid or colloidal suspension form.

Preferentiallly, nanoscale silica is the modifier introduced during condensation.

Preferentiallly, a low-order alcohol is introduced at the end of the condensation.

Preferentiallly, the low-order alcohol introduced is methanol, ethanol an isopropanol.

Preferentiallly, the hysteresis of the condensation process is limited from 70 to 100° C.

Preferentiallly, the heating time during the condensation lasts from 0.5 to 2 hours.

Preferentiallly, a surface-active agent is introduced into the chilled condensate.

Preferentiallly, the surface-active agent introduced is 2,4,7,9-tetramethyl-5-decin-4,7-diol.

Below are example embodiments of the invention defined above.

EXAMPLE 1

A reactor, equipped with a cooling system, mixer and thermometer was filled under constant stirring with: 20 kg urea, 15 kg dicyanate diamine, 28 kg diammonium phosphate, 4 kg modified starch and 55 dm$^3$ formaline and 15 dm3 water, as well as 5 kg nanosilica as a colloidal suspension. The mixture was heated to 70° C. for 15 minutes and then the temperature was raised to 95° C. and the condensation was performed for the next 30 minutes. Next, 1 dm$^3$ of isopropanol was added, and stirred for a further 5 minutes. Subsequently, the condensate was enriched with 4 kg of methoxylated melamine-formaldehyde resin, 7 kg ethylene glycol and 0.8 kg of the surface-active agent.

EXAMPLE 2

A reactor, equipped with a cooling system, mixer and thermometer was filled under constant stirring with: 18 kg urea, 20 kg dicyanate diamine, 15 kg diammonium phosphate, 10 kg ammonium phosphate, 6 kg dextrin and 60 dm$^3$ formaline and 15 dm$^3$ water as well as 1.5 kg solid nanosilica. The mixture was heated to 70° C. for 15 minutes and then the temperature was raised to 95° C. and the condensation was performed for the next 30 minutes. Next, 1 dm$^3$ of ethanol was added, and stirred for a further 5 minutes. The condensate was then cooled to about 30° C. Subsequently, the cooled condensate was enriched with 5 kg glycerol and 0.5 kg of the surface-active agent. The effectiveness of the intumescence is over 10,000%. For example, coats of 240 μm become 2.5 cm thick under the influence of radiation.

What is claimed is:

1. An intumescent fire retardant agent based on condensed amine-formaldehyde resins and phosphorus compounds comprising:
   (a) urea or melamine;
   (b) dicyanate diamide;
   (c) formaldehyde;
   (d) phosphoric acid or its nitrogen containing derivatives;
   (e) starch;
   (f) methoxylated or butoxylated melamine-formaldyde resin;
   (g) modifiers in the form of nanoscale silica molecules of 2 to 100 nanometers amounting to 1.21-5% of total condensate mass introduced during condensation of the amine-formaldehyde resin in solid form or as a colloidal dispersion;
   (h) low-order alcohols; and
   (i) a surface-active hydrating agent.

2. The agent according to claim 1, wherein the lower-order alcohol is methanol, ethanol or isopropanol.

3. A method for production of an intumescent fire retardant agent based on condensation amine-formaldehyde resins, with constant stirring and addition of phosphorus compounds containing urea or melamine, dicyanate diamide, formaldehyde, phosphoric acid or its nitrogen containing derivatives, starch or dextrin, and methoxylated or butoxylated melamine-formaldehyde resin, wherein said method further contains a step of introducing during condensation nanoscale silica modifiers amounting to 1.21-5% of total condensate mass, in solid form or as colloidal dispersions.

4. The method according to claim 3, wherein low-order alcohols are introduced at the end of the condensation.

5. The method according to claim 4, wherein an introduced low-order alcohol is methanol, ethanol or isopropanol.

6. The method according to claim 3, wherein the condensation process is contained within the range 70 to 100° C.

7. The method according to claim 3, wherein heating time during the condensation process is limited to between 0.5 to 2 hours.

8. The method according to claim 3, wherein a surface active hydrating agent is introduced into cooled condensate.

9. The method of claim 8, wherein the introduced surface-active hydrating agent is 2,4,7,9-tetramethyl-5-decin-4,7-diol.

10. The agent according to claim 1, wherein the nitrogen containing derivative is selected from the group consisting of mono- and diammonium phosphate, urea phosphate and melamine phosphate.

11. The method according to claim 3, wherein the nitrogen containing derivative is selected from the group consisting of mono- and diammonium phosphate, urea phosphate and melamine phosphate.

12. The agent according to claim 1, wherein the surface active hydrating agent includes 2,4,7,9-tetramethyl-5-decin-4,7-diol.

* * * * *